United States Patent [19]

Siekierski

[11] Patent Number: 5,606,385
[45] Date of Patent: Feb. 25, 1997

[54] VIEWFINDER WARNING FLAG FOR PHOTOGRAPHIC CAMERA

[75] Inventor: Roger A. Siekierski, Webster, N.Y.

[73] Assignee: Eastman Kodak Company, Rochester, N.Y.

[21] Appl. No.: 417,410

[22] Filed: Apr. 5, 1995

[51] Int. Cl.$^6$ ............................................. G03B 17/00
[52] U.S. Cl. ......................... 396/397; 396/401; 396/284
[58] Field of Search ................................. 354/206, 215, 354/212, 207, 213, 289.1

[56] References Cited

U.S. PATENT DOCUMENTS

| | | | |
|---|---|---|---|
| Re. 32,391 | 4/1987 | Berg | 354/215 |
| 2,289,800 | 7/1942 | Nagel | 354/207 |
| 2,750,858 | 6/1956 | Marvin et al. | 354/207 |
| 3,688,668 | 9/1972 | Ort | 354/215 |
| 3,696,723 | 10/1972 | Ernisse | 354/213 X |
| 3,820,138 | 6/1974 | Horton | 354/142 |
| 4,492,446 | 1/1985 | Zawodny et al. | 354/215 |

*Primary Examiner*—D. Rutledge
*Attorney, Agent, or Firm*—Peter J. Bilinski

[57] ABSTRACT

A film metering mechanism includes a metering slide that is released from a ready position by the pressing of a camera shutter release button such that the film metering slide is pulled by a drive spring and engages a shutter mechanism, temporarily opening the camera shutter, and at the same time is moved so an integral flag portion of the lever is visible in the camera viewfinder. As the film is moved to the next frame, the metering slide engages a perforation of the film and is pulled against the force of the drive spring by the film movement, moving the warning flag out of the viewfinder, until the metering slide returns to its initial position against a frame stop. Pressing the shutter release button disengages the metering slide from the film and starts the sequence over again.

43 Claims, 12 Drawing Sheets

VIEWFINDER WARNING FLAG FOR PHOTOGRAPHIC CAMERA

BACKGROUND OF THE INVENTION

1. Field of the Invention

This invention relates generally to film metering systems for cameras and, more particularly, to viewfinder warning flag systems to indicate proper film metering in single-use cameras.

2. Description of the Related Art

In a photographic camera, a sequence of exposed images is produced on a roll of photographic film. After each exposed image is produced, the film is moved such that an unexposed portion of the film is located at an exposure gate. When a camera user presses a shutter release button, light from a photographic scene is permitted to pass through an objective lens onto the film under control of a shutter mechanism, thereby creating an exposed image on the film at the exposure gate. The shutter is then cocked, or readied for the next exposure. It is important for the film to be moved in the camera by precisely one frame spacing for each exposure to avoid double-exposed images, irregularly spaced exposed images, and film waste. The control of film movement in a camera to ensure correct frame-to-frame spacing between exposed images is referred to as film metering.

Conventionally, some cameras have metering mechanisms that prevent the camera shutter from being cocked and triggered if the film has not been properly moved by one frame. Such mechanisms prevent metering problems, but can add a relatively great deal of bulk and expense to the camera. This can be critical in the case of, for example, single-use cameras where size, weight, and cost considerations are paramount. Many cameras include a mechanical film exposure counter that indicates the number of exposed frames on the film roll. The mechanical structure necessary to provide the exposure counter can be relatively simple, thereby minimizing size, weight, and cost. An exposure counter helps the user to determine if the film is moving properly in the camera and acts as a check on proper metering. A user, however, can easily forget to check the exposure counter and can inadvertently continue making exposures even if the film has not advanced properly in the camera or has not been properly metered.

To prevent improper film movement from occurring unnoticed, it is known to provide film metering warning flags within the field of view of camera viewfinders. A camera user looks through the viewfinder to compose a photographic scene, and therefore a warning flag in the camera viewfinder is more likely to be noticed than other indicators of improper film movement. Many such warning flag indicators, however, have rather complicated linkages that are relatively bulky and expensive to produce. Again, this is especially troublesome with respect to single-use cameras, where size, weight, and manufacturing cost are of extreme importance.

U.S. Pat. No. Reissue 32,391 to Berg describes a viewfinder warning indicator for a photographic camera in which a series of spur gears and a release clutch are used to raise a mechanical flag into the viewfinder field of view when the film is not properly advanced. Proper film advancement causes the flag to be lowered out of the viewfinder field of view. The spur gears and release clutch can be relatively bulky and costly for application to single-use cameras. U.S. Pat. No. 3,688,668 to Ort describes a film transport indicator in a camera in which a sensing finger is linked to an indicator tab. When a camera user manually advances the film a distance of one frame, the sensing finger engages a film perforation and operates through the linkage to push the indicator tab so it extends outside of the camera housing. The presence of the indicator tab outside the camera housing signals the camera user to stop advancing the film. Thus, there is no warning indicator visible in the viewfinder and there is no automatic film stop.

From the discussion above, it should be apparent that there is a need for a viewfinder metering warning flag system that provides an indication of film metering without requiring complicated mechanisms and at reasonable cost, with particular application to single-use cameras. The present invention fulfills this need.

SUMMARY OF THE INVENTION

The present invention provides a film metering mechanism with a metering slide that is urged away from a ready position by the pressing of a camera shutter release button such that an integral warning flag becomes visible in the camera viewfinder, engages a perforation hole of the film and moves along a camera frame track as the film is advanced such that the warning flag is moved out of the viewfinder, and automatically halts against a frame stop after the film has been moved a distance equal to one frame, whereupon the slide will have been returned to the ready position. Pressing the shutter release button disengages the metering slide from the film and starts the sequence over again. Thus, the film metering slide comprises a single, unitary structure that is moved by producing an exposure so that the metering slide directly engages a film perforation of the photographic film and assists in stopping the film in the camera after proper film movement has taken place. In this way, the film metering slide automatically performs the function of indicating proper movement of the film with a relatively simple, low-cost construction especially suited to the size, weight, and cost constraints of single-use cameras.

In one aspect of the invention, the film metering slide engages the shutter mechanism of the camera and thereby performs a shutter tripping function in addition to the film metering function. When the shutter release button is pressed, the film metering slide is pulled by a drive spring so that the metering slide engages a shutter mechanism and temporarily opens the camera shutter to produce an exposure and at the same time the spring moves the metering slide so the flag portion of the slide is visible in the camera viewfinder. As the film is moved to the next frame, the metering slide engages a perforation of the film and is pulled against the force of the drive spring by the film until the metering slide returns to its initial position against a frame stop.

Other features and advantages of the present invention should be apparent from the following description of the preferred embodiment, which illustrates, by way of example, the principles of the invention.

DESCRIPTION OF THE PREFERRED EMBODIMENT

Figure 1:
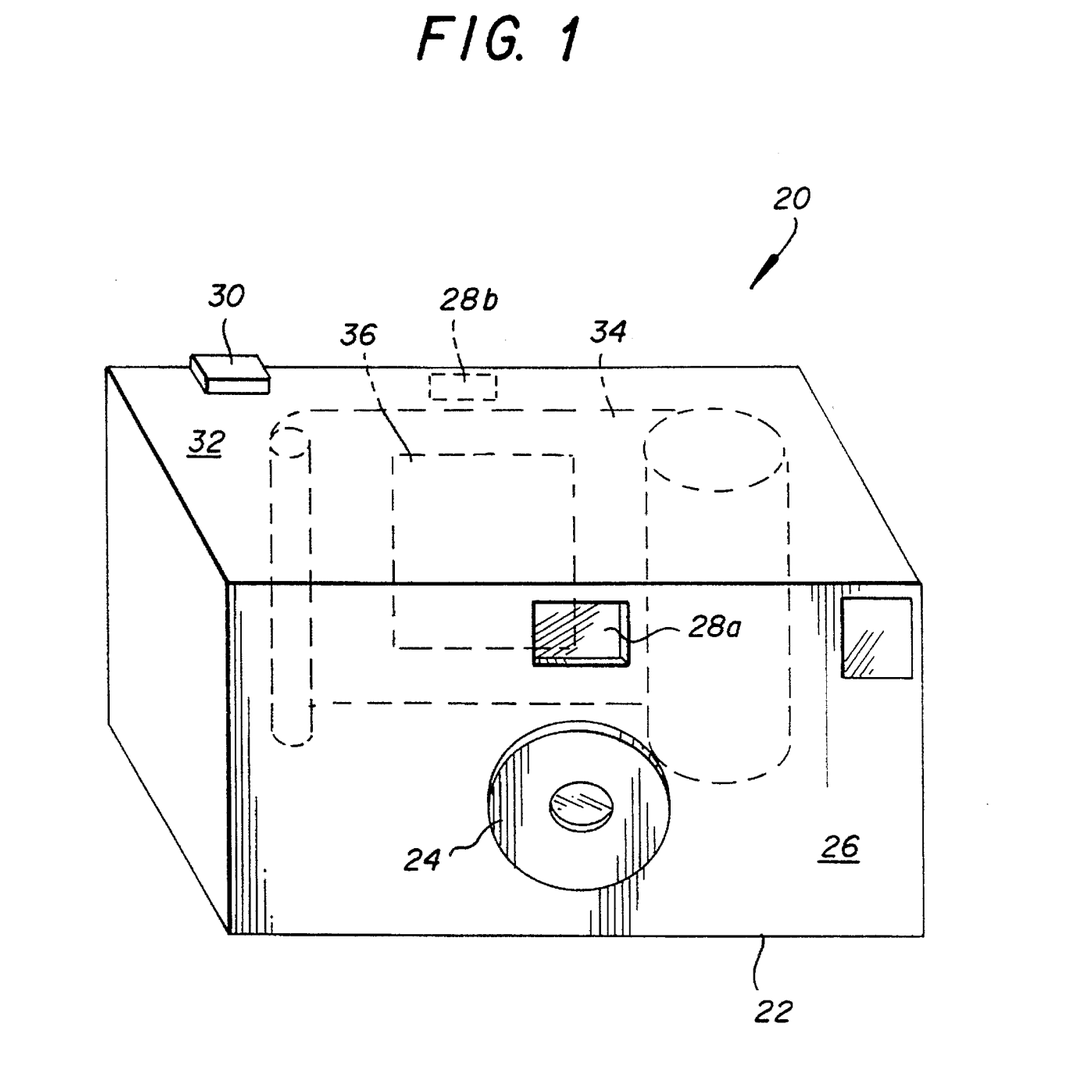
FIG. 1 is an isometric view of a camera having a film metering mechanism constructed in accordance with the present invention.

FIG. 1 shows a prepackaged, single-use camera 20 having a film metering mechanism constructed in accordance with the present invention. The camera includes a sealed outer housing/body 22, an objective lens 24 at a front surface 26 of the camera body, a viewfinder 28 with windows 28a and 28b, and a shutter release 30 on a top surface 32 of the camera body. A camera user views a photographic scene through the viewfinder and exposes one frame of photographic film by pressing the shutter release 30. A roll of photographic film 34 is shown in phantom to illustrate the relative location of the film within the camera 20. When the shutter release 30 is actuated, a shutter mechanism opens momentarily and directs light from the objective lens 24 onto the film 34 at an exposure gate 36.

Figure 2:
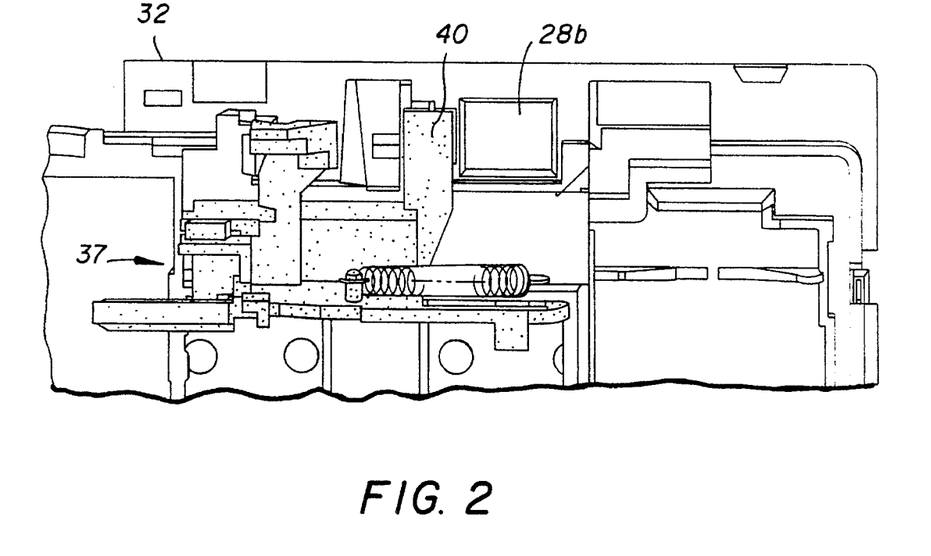
FIG. 2 is a front elevational view of the film metering mechanism of the camera illustrated in FIG. 1 showing the indicator flag moved to a position outside the viewfinder area to indicate the film has been properly moved.
Figure 3:
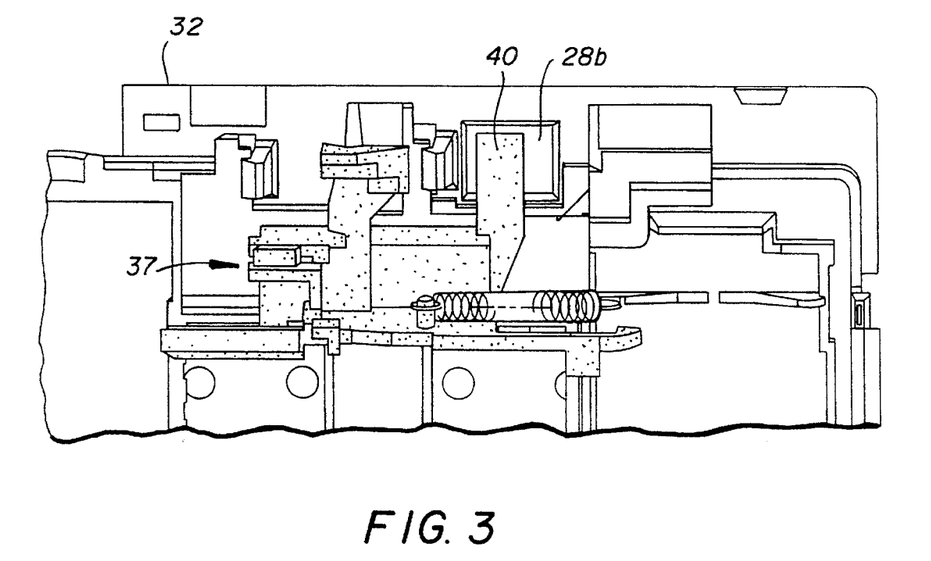
FIG. 3 is a front elevational view of the film metering mechanism illustrated in FIG. 2 showing the indicator flag visible in the viewfinder area to indicate the need for film movement.

FIG. 3 is a view of the camera 20 with the front surface 26 removed. The rear window 28b of the viewfinder is visible and shows a film metering mechanism 37 of the camera with an indicator flag 40 visible in the viewfinder area to indicate the need for film movement. FIG. 2 shows the film metering mechanism with the indicator flag moved to a position outside the viewfinder area to indicate the film has been properly moved. As will be described further below, the film metering mechanism includes a film metering slide that directly engages a single perforation of the film 34 (not illustrated in FIGS. 2 and 3 for clarity) and moves the indicator flag portion of the metering slide out of the viewfinder field of view after the film has been properly advanced following an exposure. The film metering mechanism is relatively simple to construct and relatively compact, easily fitting within the confines of a single-use camera. The film metering slide is preferably constructed out of a single plastic molded part, thereby reducing weight and manufacturing costs.

Thus, in accordance with the present invention, a film mechanism includes a film metering slide that is moved into the camera viewfinder when an exposure is produced, engages the camera film when the film is moved and moves with the film as a fresh frame is positioned, and automatically stops film movement after the film has been moved a distance of one frame.

Figure 4:
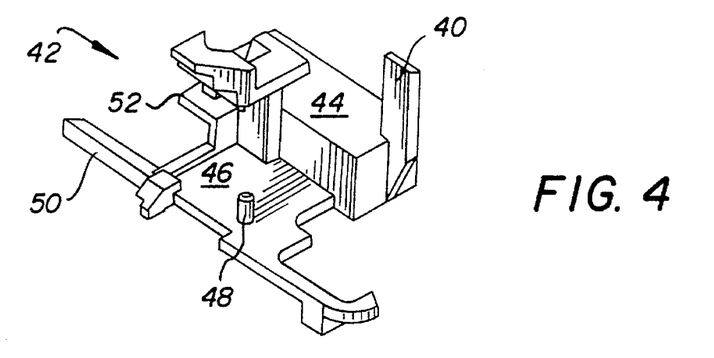
FIG. 4 is an isometric view of the film metering slide of the camera illustrated in FIG. 1.
Figure 5:
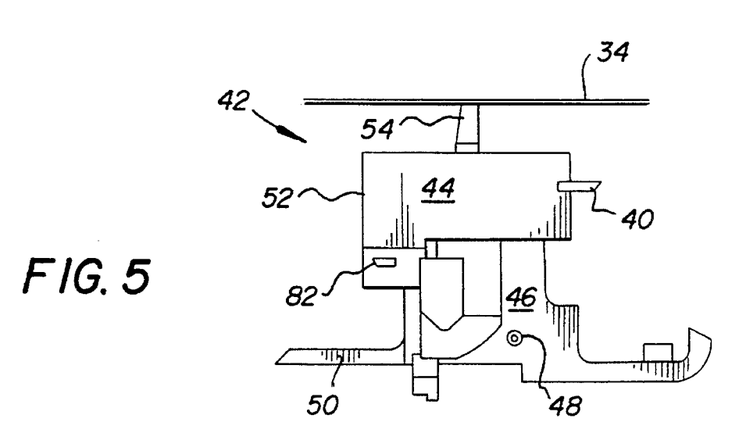
FIG. 5 is a top view of the film metering slide illustrated in FIG. 4.
Figure 6:
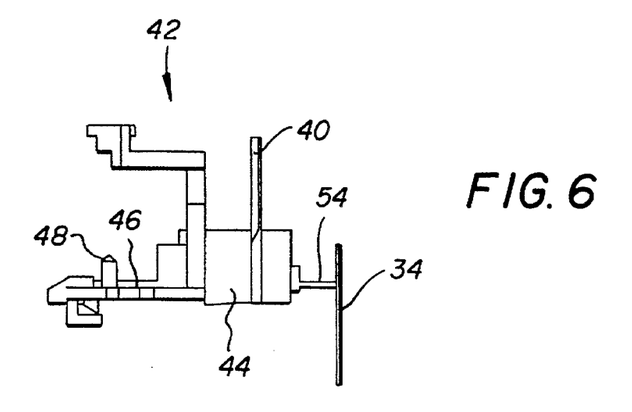
FIG. 6 is a side view of the film metering slide illustrated in FIG. 4.

FIGS. 4, 5, and 6 provide isometric, top, and side views, respectively, of a metering slide 42 constructed in accordance with the present invention and provided within the camera 20. These drawings show that the warning flag 40 is integrally formed with the film metering slide 42, projecting outwardly from a body portion 44 of the slide. A support plate 46 of the slide projects outwardly toward the front surface of the camera and includes a raised boss 48 for a driver described further below, a guide rail 50 to control movement of the lever, and a stopping face 52 that limits the travel of the film metering slide after the film has been advanced by one frame. FIG. 5 and FIG. 6 show that a protruding tab 54 projects outwardly from the back side of the body portion 44. When an exposure is produced, the film metering slide 42 is moved laterally in the camera so that the warning flag 40 is visible in the viewfinder. The rear protruding tab 54 presses against the surface of the film. In the preferred embodiment, the film in the camera is provided with an indexing mark comprising a single film perforation per frame of film. The frame indexing mark may be provided with or without additional film drive perforations, as desired.

When the film 34 is advanced in the camera 20 after an exposure is produced, the frame indexing perforation eventually passes by the rear protruding tab 54 of the film metering slide 42. When that occurs, the tab 54 quickly engages the indexing perforation by protruding into it. As the film continues to be advanced, the film metering slide is pulled along with the film. The film metering slide is moved along a predetermined path such that the stopping face 52 of the film metering slide eventually halts against a frame stop of the camera. This halts any further advancement of the film. Thus, movement of the film is automatically stopped after it has been advanced by one frame.

Figures 7, 8:
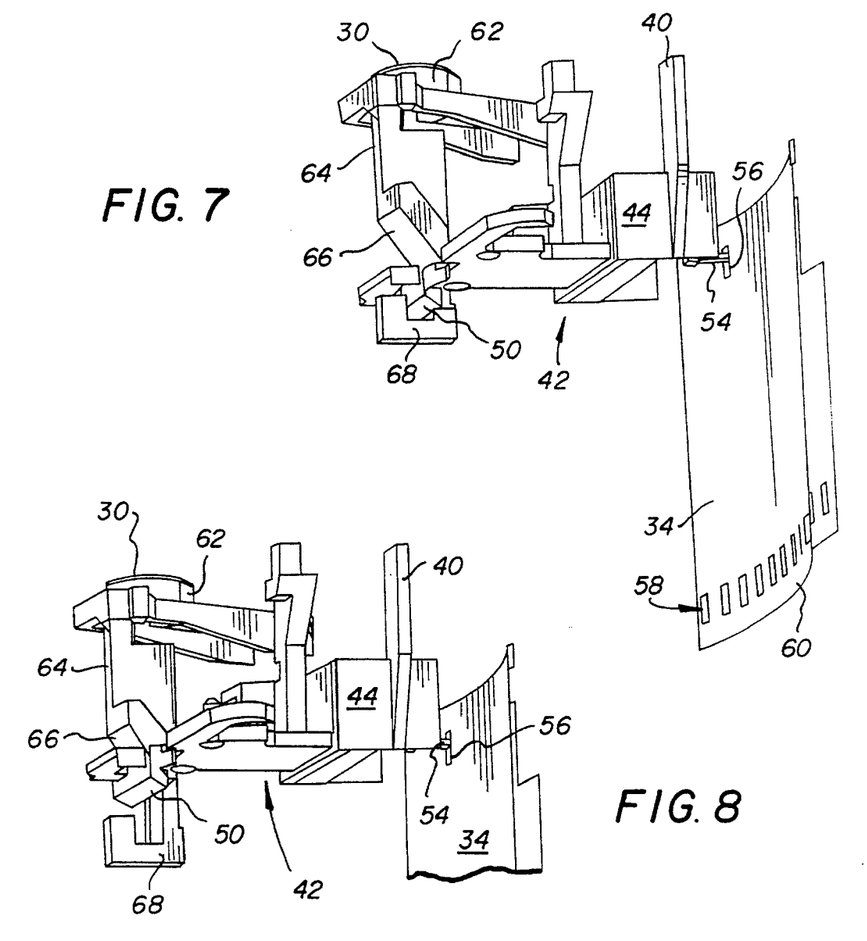
FIG. 7 is an isometric view of the film metering slide and shutter button lever illustrating their relative position in the camera shown in FIG. 1 at an initial position, ready for a next exposure.
FIG. 8 is an isometric view of the film metering slide and shutter button lever shown in FIG. 7 with the shutter button depressed from its initial position.
Figure 9:
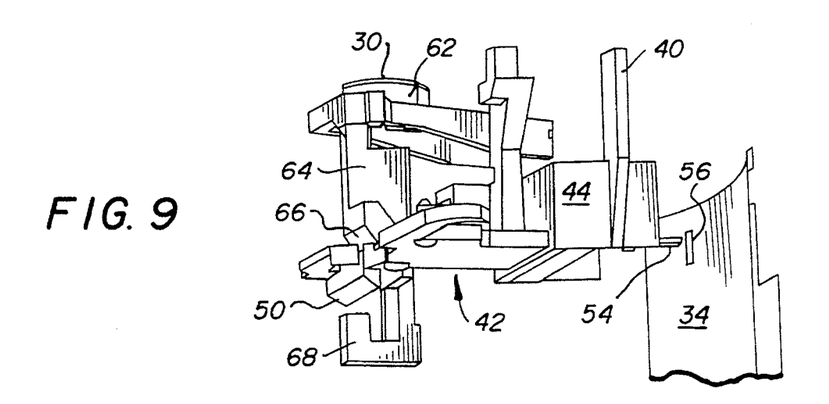
FIG. 9 is an isometric view of the film metering slide and shutter button lever shown with the shutter button depressed further from its position in FIG. 8 so that the film metering slide is disengaged from the film.

FIGS. 7, 8, and 9 illustrate the interaction between the shutter release 30 and the film metering slide 42 when the shutter release is pressed. FIG. 7 shows the shutter release 30 and film metering slide 42 in an initial ready position with the rear protruding tab 54 extending into an indexing perforation 56 of the film roll 34. One indexing perforation is provided for each frame along the length of the film roll. FIG. 7 shows that the film roll includes an optional track of drive perforations 58 along a lower edge 60 of the film roll. Those skilled in the art will appreciate that not all film types include such drive perforations, which are not necessary for functioning of the film metering slide 42. The shutter release 30 comprises a shutter button 62 with a downwardly projecting shaft 64 having an angled face 66 and a hooked end 68. The hooked end 68 locks the guide rail 50 portion of the metering slide in place relative to the indexing perforation 56, and in this way prevents the film metering slide 42 from moving toward or away from the film plane.

FIG. 8 shows the shutter release 30 after it has been actuated by the action of a camera user pressing downwardly on the shutter button 62. FIG. 8 shows that the shutter release 30 is displaced vertically relative to the ready position shown in FIG. 7 and that the angled face 66 has been moved closer to the guide rail 50 of the film metering slide 42. Thus, downward motion of the shutter release has unlocked the metering slide. FIG. 9 shows that, as the shutter release 30 continues its downward travel, the guide rail 50 of the film metering slide 42 rides along the angled face 66 of the shutter release shaft 64 and thereby is forced toward the front of the camera, pulling the protruding tab 54 of the film metering slide out of the frame indexing perforation 56.

Further details of the operation of the film metering mechanism in the camera 20 will be better understood with reference to the drawings of FIGS. 10–19. These drawings illustrate the operation of the film metering mechanism comprising the shutter release 30, film metering slide 42, and a driver that in the preferred embodiment comprises a spring 70. In the preferred embodiment, the film metering mechanism also actuates a shutter mechanism 72 via a drive tab 73 and the slide 42 includes a shutter actuation tab 74 for this purpose.

Figure 10:
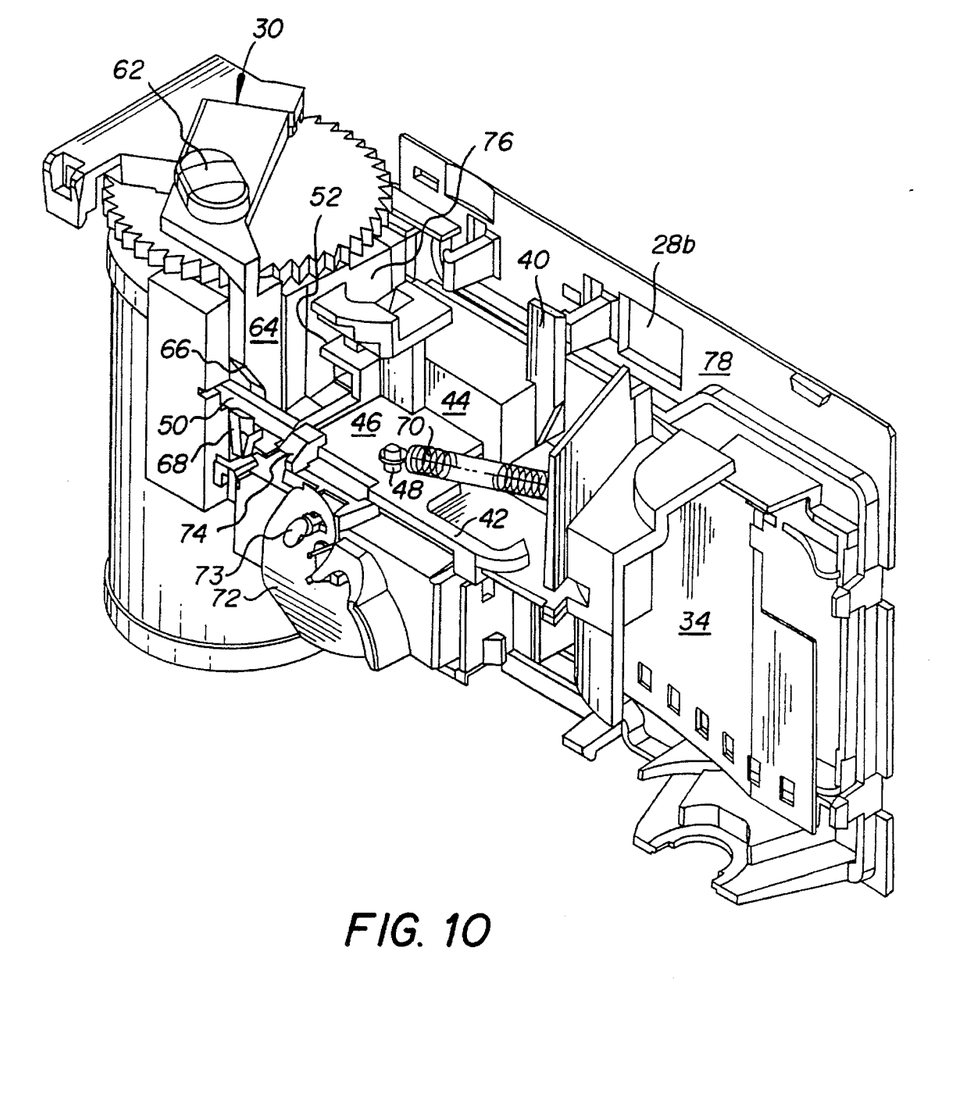
FIG. 10 and FIG. 11 are isometric views of the film metering mechanism at an initial ready position, ready for a next exposure to be produced.
Figure 11:
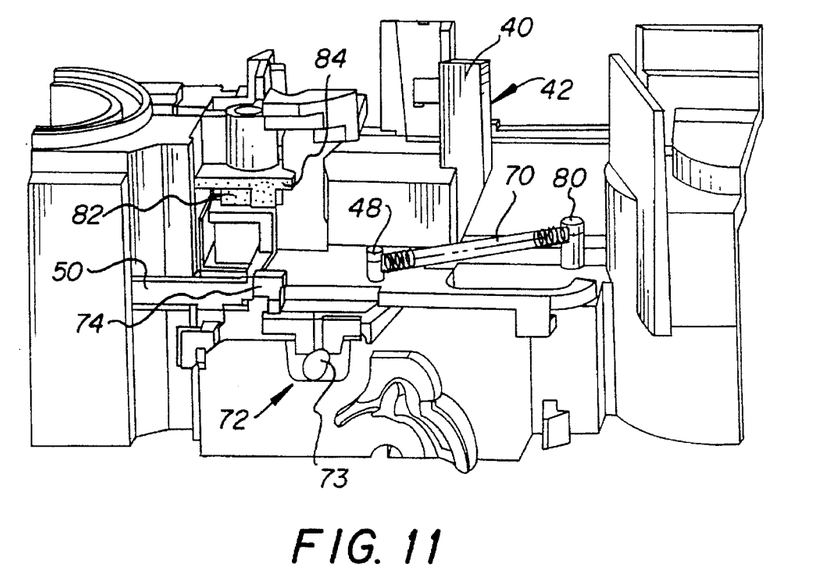

FIG. 10 and FIG. 11 show the film mechanism in the initial ready position, as was illustrated in FIG. 7. FIGS. 10 and 11 show that, in the ready position, the guide rail 50 of the film metering slide 42 rests in the hooked end 68 of the shutter release 30 and the stopping face 52 of the metering slide rests against a wall 76 of the camera frame structure 78 that forms part of the camera body 22.

FIGS. 10 and 11 also show that the metering slide shutter tab is not yet engaged with the shutter mechanism at the ready position. Most importantly, the warning flag 40 is outside of the field of view in the viewfinder 28. FIG. 11 shows that one end of the spring 70 is attached to the raised boss 48 of the metering slide 42 and the other end of the spring is attached to a camera boss 80 of the camera structure 78.

Figure 12:
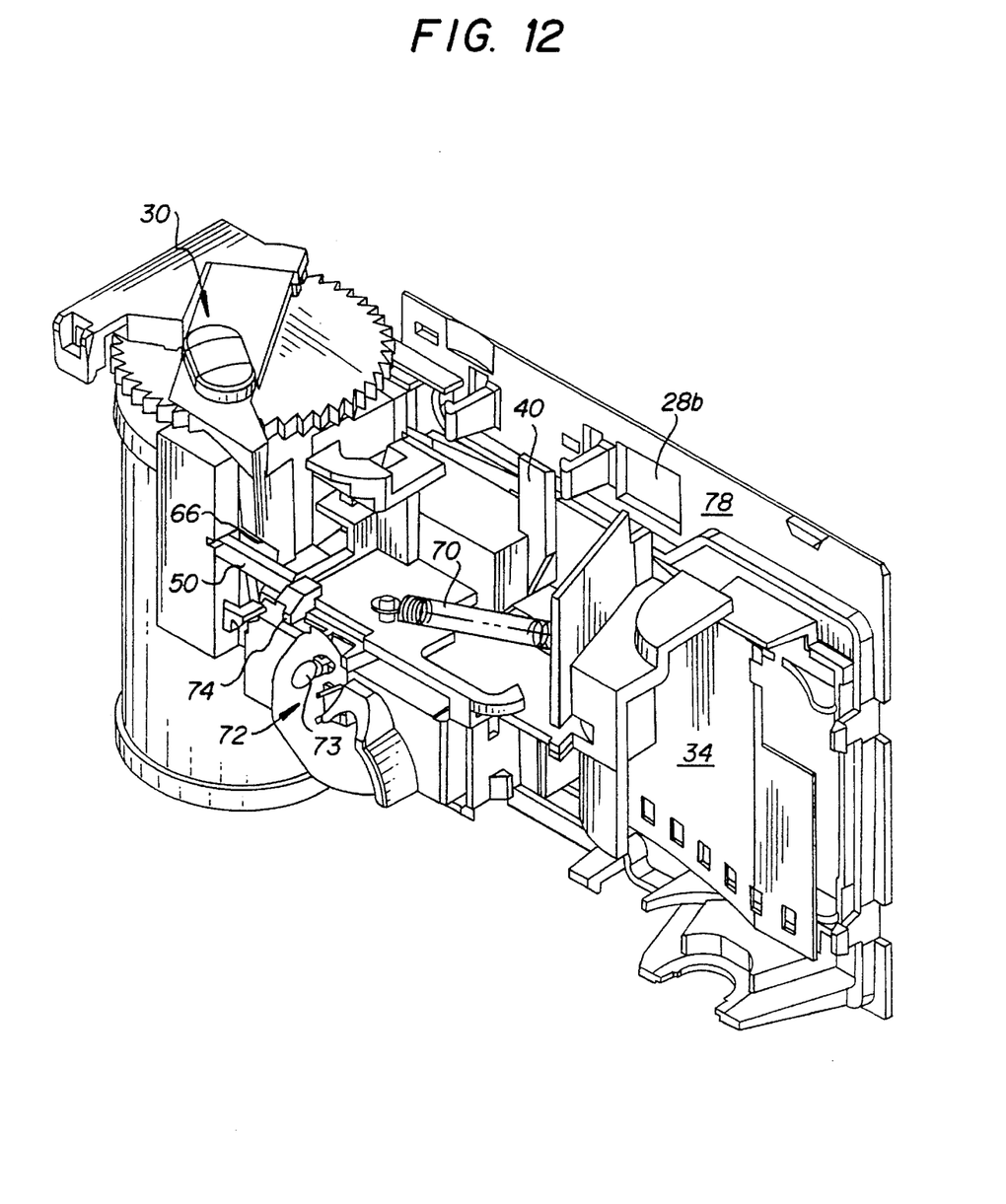
FIG. 12 and FIG. 13 are isometric views of the film metering mechanism with the shutter button depressed from its position shown in FIGS. 10 and 11 so that the shutter button has pulled the metering slide out of engagement with the film.
Figure 13:
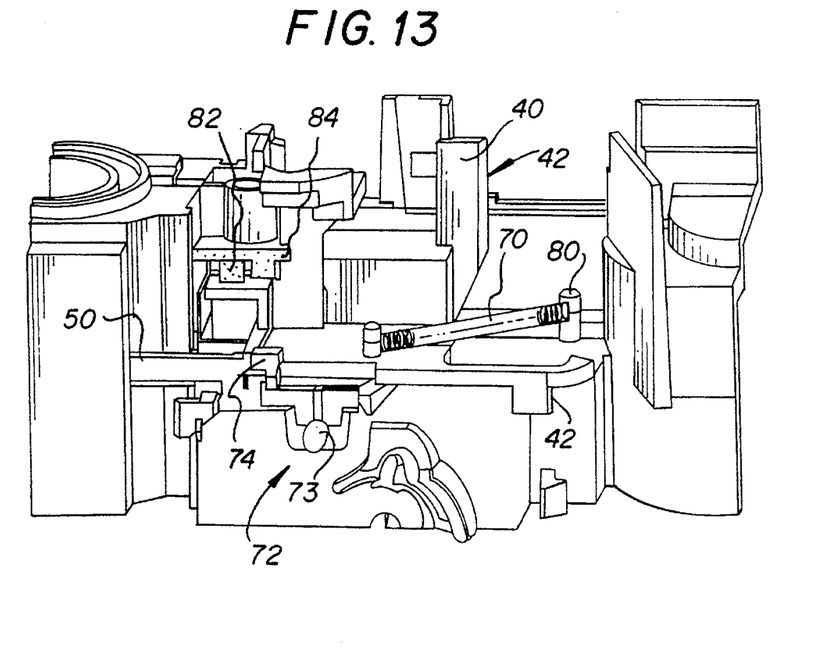

FIGS. 12 and 13 show the film metering mechanism after the shutter release 30 has been partially pressed by the camera user such that the angled face 66 of the shutter release shaft 64 has made contact with the guide rail 50 of the film metering slide 42. Thus, the angled face 66 has pushed the film metering slide 42 forward (toward the front of the camera) relative to the position in Figs. 10 and 11. As a result, the film metering slide film tab 54 has been pulled out of engagement with the frame index perforation in the film 34 and the guide rail 50 has been pulled out of engagement with the hooked end 68 of the shutter release 30.

Figure 14:
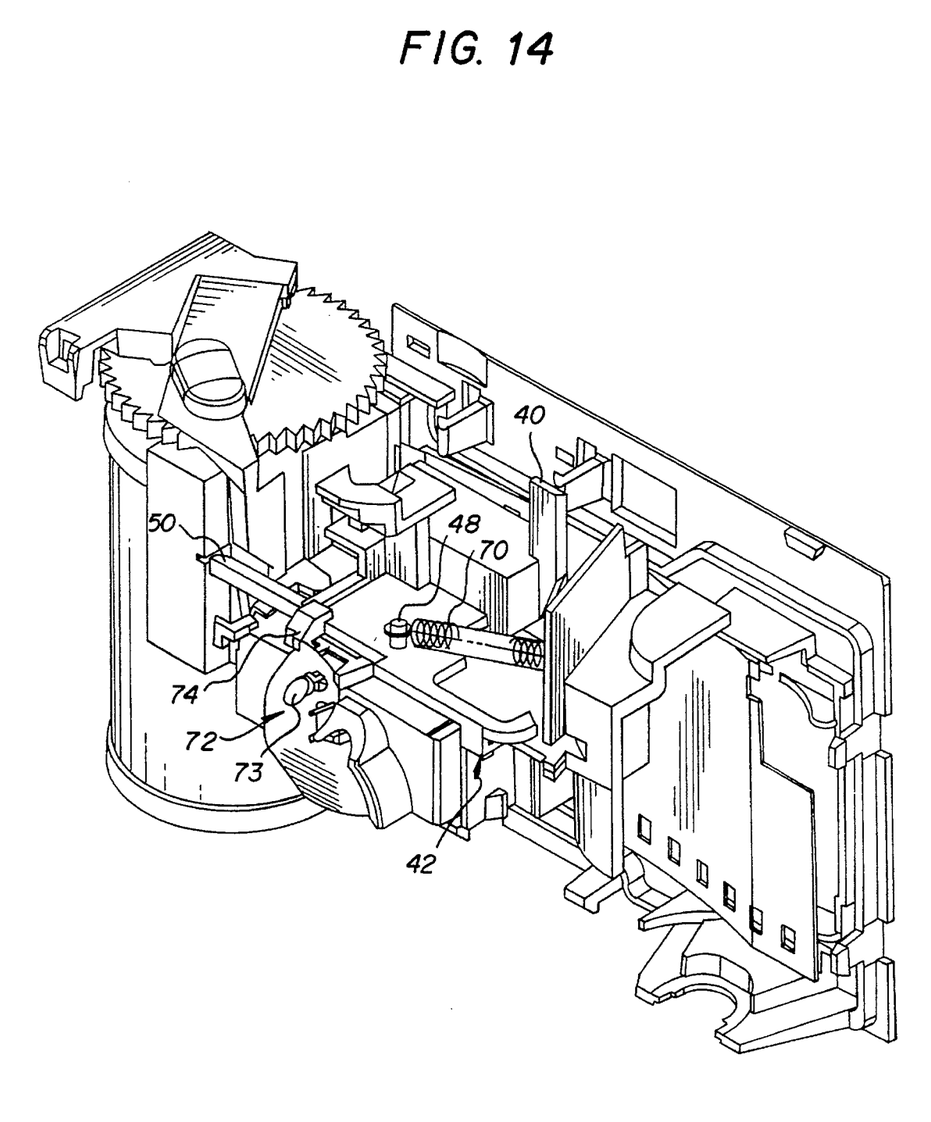
FIG. 14 and FIG. 15 are isometric views of the film metering mechanism later in time from FIGS. 12 and 13, showing the metering slide pulled by the metering spring.
Figure 15:
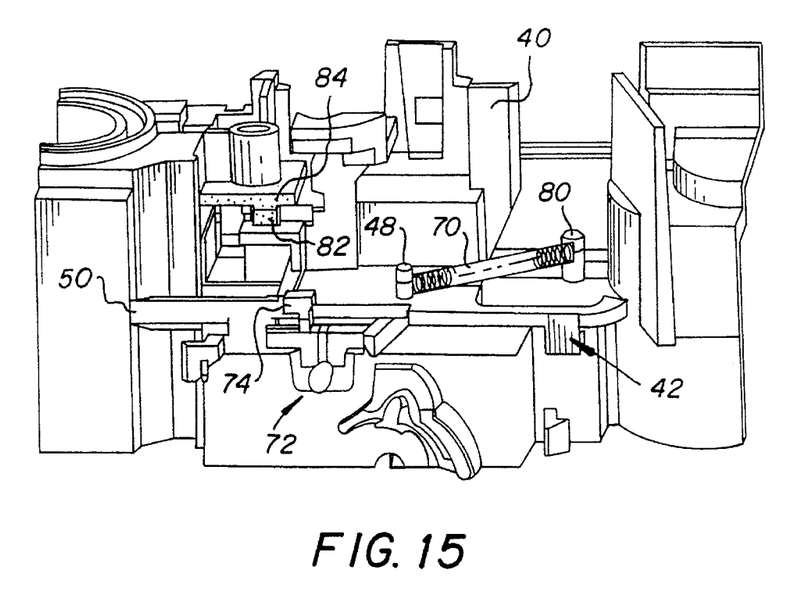
Figure 16:
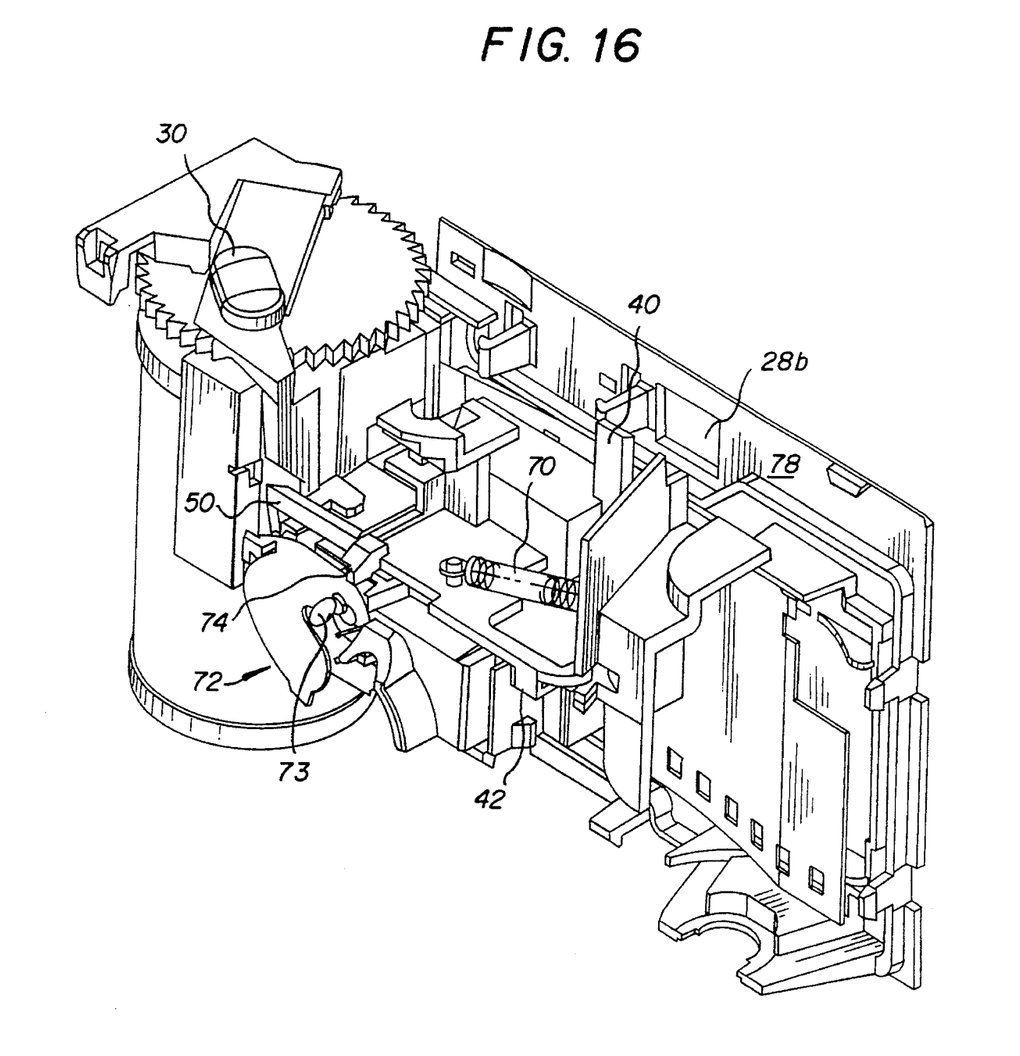
FIG. 16 and FIG. 17 are isometric views of the film metering mechanism later in time from FIGS. 14 and 15, showing the metering slide in position after it has tripped the shutter.
Figure 17:
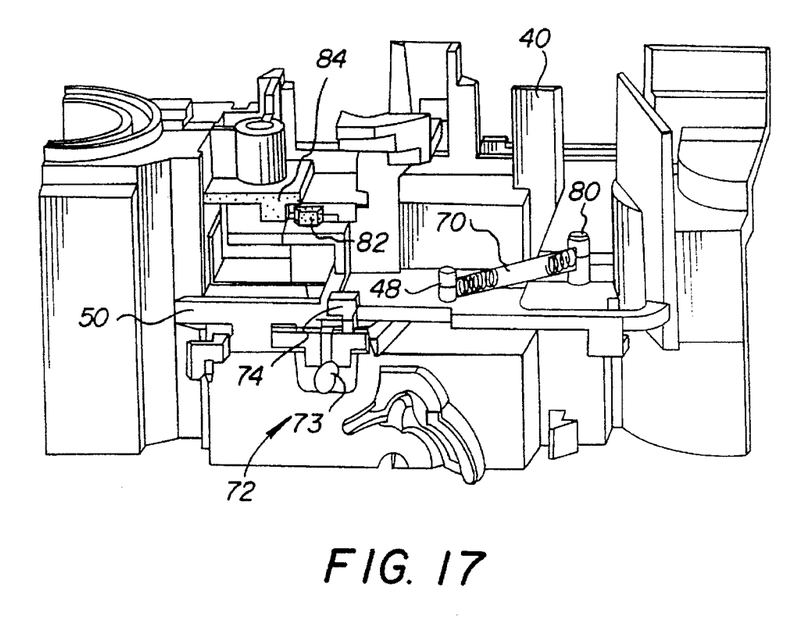

Because the film tab 54 of the film metering slide 42 is pulled out of engagement with the film 34, the slide is free to be pulled toward the structures illustrated at the right side of FIGS. 12 and 13 by the force of the drive spring 70. FIGS. 14 and 15 show the film metering slide 42 after the spring 70 has moved it laterally so that the shutter tab 74 has made contact with the shutter drive tab 73 of the shutter mechanism 72. FIGS. 16 and 17 show the film metering slide after it has been pulled further by the force of the spring relative to the position shown in FIGS. 14 and 15. Thus, the shutter tab 74 has driven the shutter mechanism so that an exposure has been produced on the film 34.

Figure 18:
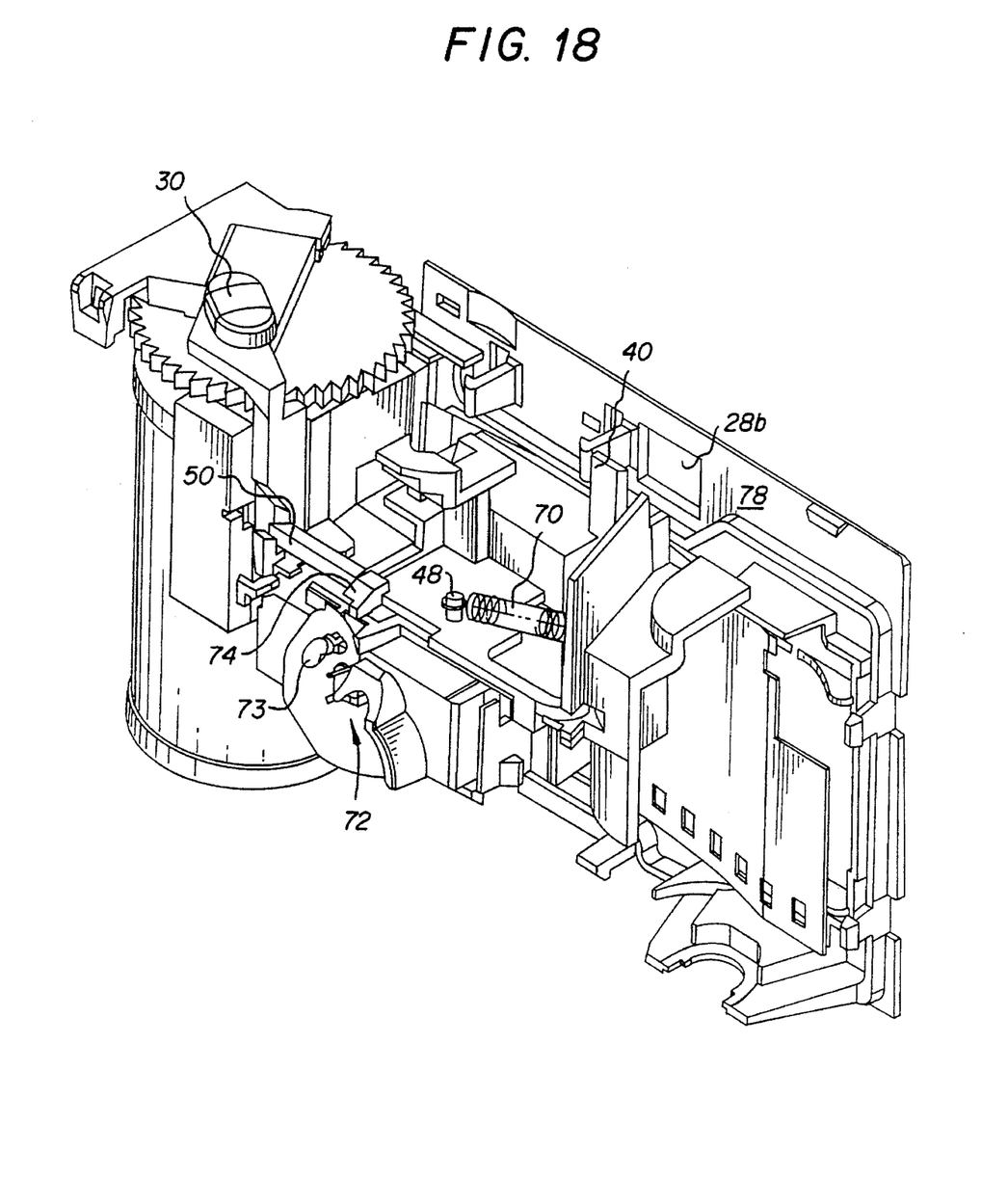
FIG. 18 and FIG. 19 are isometric views of the film metering mechanism later in time from FIGS. 16 and 17, after the shutter button and shutter mechanism have returned to their ready position, and in which the indicator flag is visible in the viewfinder area.
Figure 19:
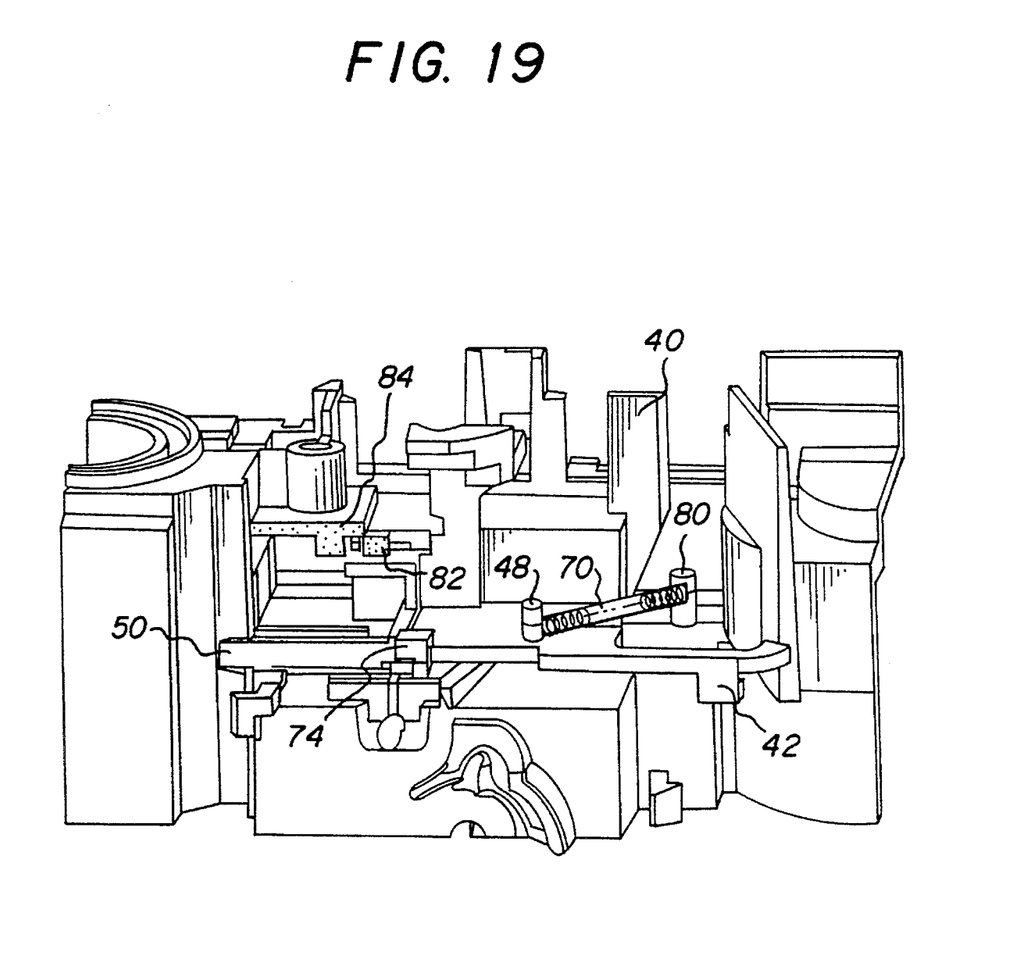

FIGS. 18 and 19 show the film metering slide 42 after it has completed its travel in driving the shutter mechanism 72 so that its position with respect to the front and back surfaces of the camera is the same as its ready position. That is, the film metering slide is in its ready position except that it has not yet engaged a frame indexing perforation of the film and been pulled to the left by film advancement so that it returns to its ready position. This can be observed by noting the relative position of the guide rail 50 in FIGS. 18 and 19 as compared with its position in FIGS. 10 and 11. Thus, the film metering slide has come to rest at the rightward end of its movement with the film tab 54 pressing against the film 34. The warning flag 40 is visible in the viewfinder 28.

When the film is advanced, an indexing perforation in the film eventually will reach the film tab 54, which will then slip into the perforation. When the tab slips into the perforation, the film metering slide 42 will be engaged with the film and will be pulled along with the film until the metering slide makes contact with the camera structure 78. In particular, the stopping face 52 of the film metering slide 42 will come into contact with the wall 76, which will prevent further movement of the film metering slide. This will conclude the movement of the film metering slide, which will then be back in its original position as illustrated in FIGS. 10 and 11. The next frame exposure can then be completed with the camera user actuating the shutter release 30.

The operation of the film metering mechanism as it travels along the predetermined path defined by the hook of the shutter release and the various camera structural surfaces can be better understood by viewing the drawings of FIGS. 10 through 19 with respect to certain reference points. For example, the film metering slide 42 includes a front post section 82, FIG. 5, which can be observed moving around a corresponding camera post 84, which is fixed to the camera structure 78 in FIGS. 11, 13, 15, 17, and 19 as the film metering slide is moved laterally along the predetermined path established by the camera track. From the description above, it should be understood that at the end of the illustrated travel path (FIG. 19) the structural components are returned to their ready position (FIG. 11 ) by movement of the film 34 to the next frame.

Thus, the film metering mechanism described above provides a relatively simple, low cost construction that provides a film metering slide with an integral viewfinder warning flag that is visible in the viewfinder after a shutter has been produced and that is pulled out of the viewfinder as film is advanced to a fresh fame. The film metering slide itself, and therefore indirectly the warning flag, is directly engaged with film so as to provide a positive coupling between the film and the warning flag and to provide a simplified construction. The film metering mechanism is especially suited to use in a prepackaged, single-use camera having a sealed body containing a roll of photographic film, but also can be applied to a variety of camera combinations.

The present invention has been described above in terms of a presently preferred embodiment so that an understanding of the present invention can be conveyed. There are, however, many configurations for camera film advancement mechanisms not specifically described herein, but with which the present invention is applicable. The present invention should therefore not be seen as limited to the particular embodiment described herein, but rather, it should be understood that the present invention has wide applicability with respect to camera film advancement mechanisms generally. All modification, variations, or equivalent arrangements that are within the scope of the attached claims therefore should be considered within the scope of the invention.

The following elements and their corresponding reference numerals are used in the drawings:
single-use camera 20
camera housing/body 22
objective lens 24
front surface 26
viewfinder 28
viewfinder windows 28a, 28b
shutter release button 30
camera top surface 32
photographic film 34
exposure gate 36
indicator flag 40
film metering slide 42
metering slide body portion 44
metering slide support plate 46
spring boss 48
guide rail 50
stopping face 52
slide tab 54
indexing perforation 56
film drive perforations 58
film lower edge 60
shutter button 62
shutter release shaft 64
angled face 66
hooked end 68
drive spring 70
shutter mechanism 72
shutter mechanism drive tab 73
metering slide shutter tab 74
wall 76
camera structure 78
camera boss 80
front post section 82
camera post 84

I claim:

1. A film metering mechanism comprising:

a shutter release of a camera that is actuated to initiate an exposure producing sequence during which a frame of a film roll in the camera is exposed, thereby producing an exposed frame, and the film roll is thereafter moved to a new frame position for a next exposure producing sequence;

a metering slide, having an integral warning flag, that is urged away from a ready position in the camera when the shutter release is actuated to initiate a frame producing sequence such that the integral warning flag is moved into a viewfinder of the camera, is engaged with a frame indexing perforation in the film roll in response to movement of the film roll to the new frame position such that the metering slide is moved with the film roll and the warning flag is moved out of the viewfinder, and is automatically halted against a camera stop after the film roll has been moved a distance equal to one frame, thereby returning the metering slide to the ready position;

a driver that pulls the metering slide away from the ready position when the shutter release is actuated; and a camera track that defines a predetermined path followed by the metering slide as it is pulled by the driver, such that the camera track includes the camera stop against which the metering slide rests when in the ready position and to which the metering slide is returned by proper movement of the film roll after the actuation of the shutter release, wherein the driver includes a drive spring attached at a first end to the metering slide and at a second end to the camera track.

2. A film metering mechanism as defined in claim 1, wherein the metering slide and warning flag are formed from a plastic material.

3. A film metering mechanism as defined in claim 1, wherein the spring pulls the metering slide in a substantially longitudinal direction along the predetermined camera track path.

4. A film metering mechanism as defined in claim 3, wherein the metering slide includes an outwardly projecting film tab that is sized to fit into the film indexing perforation when the film roll is moved in the camera after the shutter release is actuated.

5. A film metering mechanism as defined in claim 4, wherein the metering slide includes a shutter tab that actuates a shutter mechanism of the camera as the metering slide is moved, thereby producing a frame exposure.

6. A film metering mechanism as defined in claim 5, wherein the metering slide includes a drive tab which engages the shutter tab for actuating the shutter mechanism.

7. A film metering mechanism as defined in claim 4, wherein the shutter release urges the metering slide out of engagement with the frame indexing perforation when the shutter release is actuated, thereby permitting lateral movement of the metering slide to take place in the predetermined camera track path under urging from the driver.

8. A film metering mechanism as defined in claim 7, wherein the shutter release includes a shaft and an angled face located on the shaft such that when the shutter release is actuated by pressing down on the shaft, the angled face is thereby moved into contact with the metering slide such that the metering slide slides along the angled face and is moved out of engagement with the frame indexing perforation.

9. A film metering mechanism as defined in claim 8, wherein the predetermined path defined by the camera track extends along a direction parallel to the plane of the exposed frame.

10. A film metering mechanism as defined in claim 2, wherein the shutter release further includes a hooked end that locks one end of the metering slide against movement toward and away from the frame indexing perforation.

11. A film metering mechanism as defined in claim 10, wherein the camera track includes the hooked end of the shutter release.

12. A film metering mechanism as defined in claim 10, wherein the metering slide further includes a guide rail that is supported by the hooked end of the shutter release such that the guide rail slides in the hooked end as the metering slide is pulled by the drive spring.

13. A film metering mechanism as defined in claim 8, wherein the metering slide further includes a guide rail that is supported by the shutter release such that the metering slide is guided in its movement by the shutter release.

14. A film metering mechanism for use in a photographic camera that includes a camera housing that receives a roll strip of photographic film, an exposure gate in the camera housing that defines a shutter plane across which a length of the photographic film is extended, and a viewfinder, the film metering mechanism comprising:

a shutter release that is actuated to initiate a frame producing sequence during which a shutter mechanism is actuated to expose a frame of the photographic film at the exposure gate, thereby producing an exposed frame, and the film roll is thereafter moved to a new frame position for a next frame producing sequence;

a metering slide that is urged away from a ready position when the shutter release is actuated so as to move the metering slide in the shutter plane such that it engages an indexing perforation hole of the film and moves along a camera frame track in response to movement of the film roll such that an integral warning flag is moved out of the viewfinder, and automatically halts against a frame stop after a length of the film roll has been moved a distance equal to one frame, thereby returning the metering slide to the ready position; and a transport mechanism that moves the metering slide along a predetermined frame track and permits the metering slide to return to the ready position after a length of the film roll has been moved a distance of one film frame, wherein the transport mechanism comprises:

a drive spring that pulls the metering slide away from the ready position and out of engagement with the film indexing perforation hole when the shutter release is actuated; and a frame track that defines a predetermined path followed by the metering slide as it is pulled by the drive spring, such that the frame track includes the frame stop against which the metering slide rests when in the ready position and to which the metering slide is returned by movement of the film roll a distance of one frame after the actuation of the shutter release, wherein the shutter release includes an angled face such that actuating the shutter release moves the angled face into contact with the film metering slide, allowing the film metering slide to slide along the angled face and moving the film metering slide out of engagement with the film indexing perforation hole.

15. A film metering mechanism as defined in claim 14, wherein the film metering slide and warning flag are formed from a plastic material.

16. A film metering mechanism as defined in claim 14, wherein the drive spring is attached at a first end to the metering slide and is attached at a second end to the camera frame.

17. A film metering mechanism as defined in claim 16, wherein the film metering slide includes a protruding foot that fits into the film indexing perforation hole when the film roll is moved in the camera after the shutter release is actuated.

18. A film metering mechanism as defined in claim 17, wherein the shutter release urges the metering slide out of engagement with the film indexing perforation hole when the shutter release is actuated, thereby permitting lateral movement of the metering slide to take place in the predetermined frame track path under urging from the drive spring.

19. A photographic camera comprising:

a camera housing that receives a roll strip of photographic film;

an exposure gate in the camera housing that defines a shutter plane across which a length of the photographic film is extended;

a shutter release that is actuated to initiate a frame producing sequence during which a shutter mechanism is actuated to expose a frame of the photographic film at the exposure gate, thereby producing an exposed frame, and the film roll is thereafter moved to a new frame position for a next frame producing sequence;

a metering slide that is urged away from a ready position when the shutter release is actuated so as to move the metering slide in the shutter plane such that it engages a frame indexing perforation of the film and moves along a camera frame track in response to movement of the film roll such that an integral warning flag is moved out of the viewfinder, and automatically halts against a frame wall after the film roll has been moved a distance equal to one frame, thereby returning the metering slide to the ready position; and a transport mechanism that moves the metering slide along a predetermined path and permits the metering slide to return to the ready position after the film roll has been moved a distance of one film frame;

wherein the shutter release includes a shaft and an angled face located on the shaft such that when the shutter release is actuated, the angled face is moved into contact with the metering slide such that the metering slide slides along the angled face and is moved out of engagement with the frame indexing perforation.

20. A photographic camera as defined in claim 19, wherein the metering slide and warning flag are formed from a plastic material.

21. A photographic camera as defined in claim 19, wherein the transport mechanism comprises:

a drive spring that pulls the metering slide away from the ready position and out of engagement with the frame indexing perforation when the shutter release button is actuated; and a camera track that defines a predetermined path followed by the metering slide as it is pulled by the drive spring, such that the camera track includes the frame wall against which the metering slide rests when in the ready position and to which the metering slide is returned by movement of the film roll a distance of one frame after the actuation of the shutter release.

22. A photographic camera as defined in claim 21, wherein the drive spring is attached at a first end to the metering slide and is attached at a second end to the camera frame.

23. A photographic camera as defined in claim 22, wherein the metering slide includes a protruding tab that fits into the frame indexing perforation when the film roll is moved in the camera after the shutter release is actuated.

24. A photographic camera as defined in claim 23, wherein the shutter release urges the metering slide out of engagement with the frame indexing perforation when the shutter release is actuated, thereby permitting lateral movement of the metering slide to take place in the camera track under urging from the drive spring.

25. A photographic camera as defined in claim 21, wherein the predetermined path defined by the camera track extends along a direction parallel to the plane of the exposed frame.

26. A photographic camera as defined in claim 21, wherein the shutter release further includes a hooked end that locks one end of the metering slide against movement toward and away from the frame indexing perforation.

27. A photographic camera as defined in claim 26, wherein the camera track includes the hooked end of the shutter release.

28. A photographic camera as defined in claim 27, wherein the metering slide further includes a guide rail that is supported by the hooked end of the shutter release such that the guide rail slides in the hooked end as the metering slide is pulled by the drive spring.

29. A photographic camera as defined in claim 20, wherein the metering slide further includes a guide rail that is supported by the shutter release such that the metering slide is guided in its movement by the shutter release.

30. A prepackaged photographic combination comprising:

a sealed camera housing;

a roll strip of photographic film contained in the housing;

an exposure gate in the camera housing that defines a shutter plane across which a length of the photographic film is extended;

an objective lens;

a shutter release that is actuated to initiate a frame producing sequence during which a shutter mechanism is actuated to permit light from a photographic scene to pass through the objective lens and expose a frame of the photographic film roll at the exposure gate, thereby producing an exposed frame, and the film roll is thereafter moved to a new frame position for a next frame producing sequence;

a metering slide that is urged away from a ready position when the shutter release is actuated so as to move the metering slide in the shutter plane such that it engages a frame indexing perforation of the film and moves along a camera frame track in response to movement of the film roll such that an integral warning flag is moved out of the viewfinder, and automatically halts against a frame wall after the film roll has been moved a distance equal to one frame, thereby returning the metering slide to the ready position; and a transport mechanism that moves the metering slide along a predetermined path and permits the metering slide to return to the ready position after the film roll has been moved a distance of one film frame.

31. A photographic combination as defined in claim 30, wherein the metering slide and warning flag are formed from a plastic material.

32. A photographic combination as defined in claim 30, wherein the transport mechanism comprises:

a drive spring that pulls the metering slide away from the ready position and out of engagement with the frame indexing perforation when the shutter release button is actuated; and a camera track that defines a predetermined path followed by the metering slide as it is pulled by the drive spring, such that the camera track includes the frame wall against which the metering slide rests when in the ready position and to which the metering slide is returned by proper movement of the film roll after the actuating of the shutter release button.

33. A photographic combination as defined in claim 32, wherein the drive spring is attached at a first end to the metering slide and is attached at a second end to the camera frame.

34. A photographic combination as defined in claim 33, wherein the metering slide includes a protruding tab that fits into the frame indexing perforation when the film roll is moved in the camera after the shutter release button is actuated.

35. A photographic combination as defined in claim 34, wherein the shutter release button urges the metering slide out of engagement with the frame indexing perforation when the shutter release button is actuated, thereby permitting lateral movement of the metering slide to take place in the camera track under urging from the drive spring.

36. A photographic combination as defined in claim 35, wherein the shutter release button includes an angled face such that actuating the shutter release button moves the angled face into contact with the metering slide such that the metering slide slides along the angled face and is moved out of engagement with the frame indexing perforation.

37. A photographic combination as defined in claim 36, wherein the predetermined path defined by the camera track extends along a direction parallel to the plane of the exposed frame.

38. A photographic combination as defined in claim 37, wherein the shutter release further includes a hooked end that supports one end of the metering slide.

39. A photographic combination as defined in claim 38, wherein the camera track includes the hooked end of the shutter release.

40. A photographic combination as defined in claim 39, wherein the metering slide further includes a guide rail that is supported by the hooked end of the shutter release such that the guide rail slides in the hooked end as the metering slide is pulled by the drive spring.

41. A photographic combination as defined in claim 40, wherein the metering slide further includes a guide rail that is supported by the shutter release such that the metering slide is guided in its movement by the shutter release.

42. A film metering mechanism comprising:

a shutter release of a camera that is actuated to initiate an exposure producing sequence during which a frame of a film roll in the camera is exposed, thereby producing an exposed frame, and the film roll is thereafter moved to a new frame position for a next exposure producing sequence;

a metering slide that is urged away from a ready position in the camera when the shutter release is actuated to initiate a frame producing sequence is engaged with a frame indexing perforation in the film roll in response to movement of the film roll to the new frame position such that the metering slide is moved with the film roll, and is automatically halted against a camera stop after the film roll has been moved a distance equal to one frame, thereby returning the metering slide to the ready position; and a transport mechanism that moves the metering slide along a predetermined frame track and permits the metering slide to return to the ready position after the film roll has been moved a distance of one film frame, is characterized in that;

the shutter release includes a shaft and an angled face located on the shaft such that when the shutter release is actuated by pressing down on the shaft, the angled face is thereby moved into contact with the metering slide such that the metering slide slides along the angled face and is moved out of engagement with the frame indexing perforation.

43. A film metering mechanism as defined in claim 42, wherein the shutter release further includes a hooked end that locks one end of the metering slide against movement toward and away from the frame indexing perforation.

* * * * *

IN THE UNITED STATES PATENT AND TRADEMARK OFFICE
CERTIFICATE OF CORRECTION

PATENT NO.: 5,606,385
DATED: February 25, 1997
INVENTOR(S): Roger A. Siekierski It is certified that an error appears in the above-identified patent and that said Letters Patent is hereby corrected as shown below:

Column 8, Claim 10, Line 1     Delete "A film metering mechanism as defined in claim 2," and insert --A film metering mechanism as defined in claim 8,--

Signed and Sealed this

Eleventh Day of November, 1997

Attest:

BRUCE LEHMAN

*Attesting Officer*     Commissioner of Patents and Trademarks